Oct. 29, 1963 N. P. GLUTH 3,109,143

SYNCHRONOUS DEMODULATOR FOR RADIOTELEGRAPH SIGNALS WITH PHASE LOCK FOR LOCAL OSCILLATOR DURING BOTH MARK AND SPACE

Filed April 1, 1960

Norman P. Gluth,
*INVENTOR.*
*BY.*
Noel B. Hammond
*AGENT.*

United States Patent Office 3,109,143

Patented Oct. 29, 1963

3,109,143

SYNCHRONOUS DEMODULATOR FOR RADIO-TELEGRAPH SIGNALS WITH PHASE LOCK FOR LOCAL OSCILLATOR DURING BOTH MARK AND SPACE

Norman P. Gluth, Orange, Calif., assignor to Hughes Aircraft Company, Culver City, Calif., a corporation of Delaware Filed Apr. 1, 1960, Ser. No. 19,215
7 Claims. (Cl. 325—320)

Figures 1, 2:
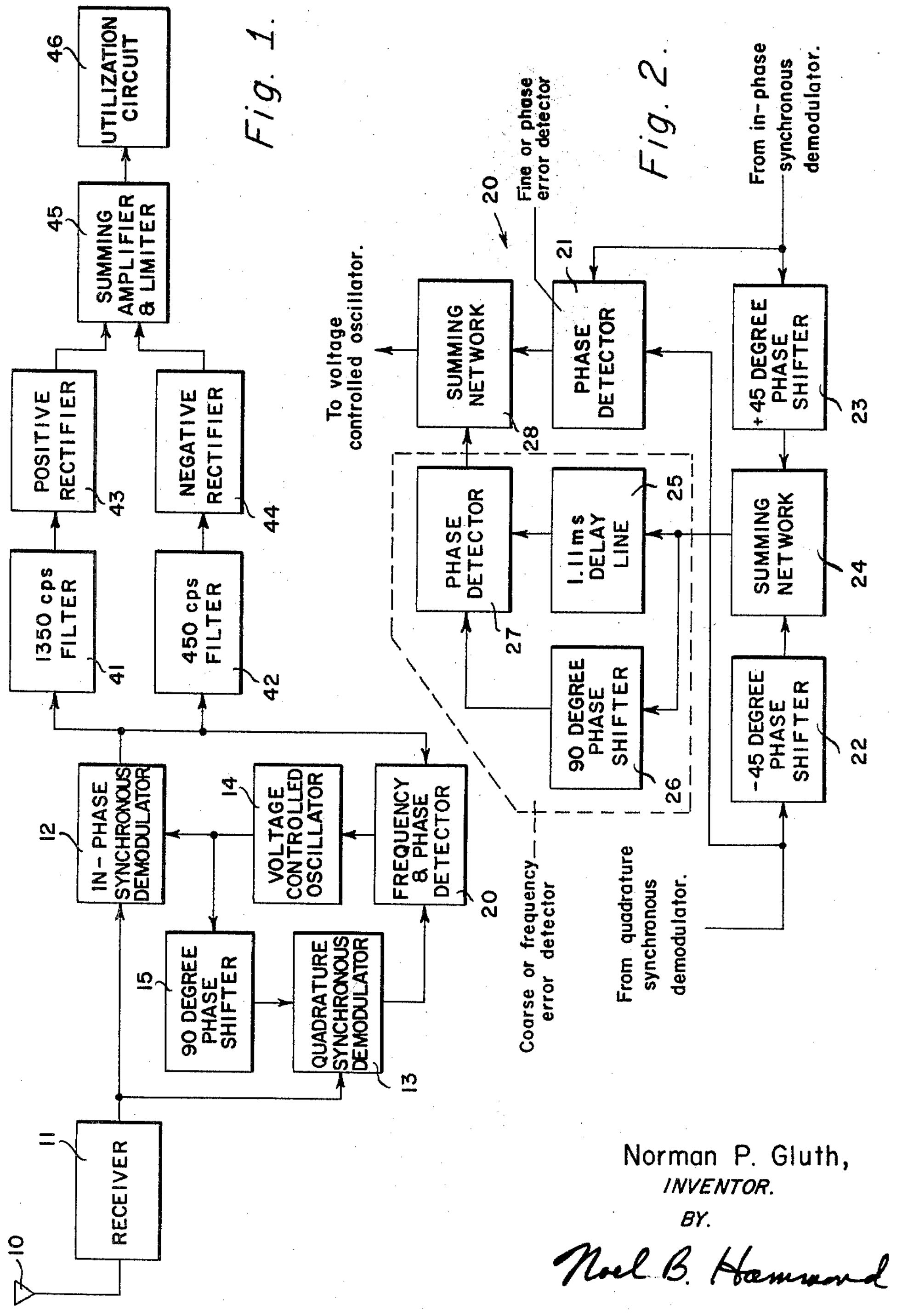

The present invention relates to radio receivers for demodulating frequency-shift-keyed radio signals, and more particularly, to a receiver having a novel automatic frequency control circuit enabling compatible demodulation of a frequency-shift-keyed radio signal conveyed by either angle modulation or amplitude modulation, with or without suppression of the carrier wave and/or one sideband.

In amplitude modulation of a carrier wave, an upper sideband is produced having a frequency equal to the carrier wave frequency plus the modulating frequency and a lower sideband is produced having a frequency equal to the carrier wave frequency minus the modulating frequency. Thus, if a carrier wave having a frequency of five megacycles per second, for example, is amplitude modulated by a 450 cycles per second modulating wave, sidebands will be produced at five megacycles per second plus and minus 450 cycles per second or at 5,000,450 and 4,999,550 cycles per second. That is, energy will be present at the sideband frequencies as well as at the carrier wave frequency of five megacycles per second.

In one form of radio telegraphy, a modulated carrier wave is emitted at all times, the modulating wave being alternated between two frequencies to indicate the telegraph symbols of "mark" and "space." Thus, if a signal at the frequency of 450 cycles per second is chosen to represent a space symbol and a signal at 1350 cycles per second is chosen to represent a mark symbol, then sidebands will appear alternately at 450 and 1350 cycles per second on each side of the carrier wave frequency in accordance with the telegraph message to be transmitted.

As is well known, the carrier wave component of an amplitude modulated wave is not affected in any way by the presence or absence of modulation and so contains no part of the information being transmitted. Thus, the carrier wave may be suppressed and only the sidebands transmitted. Furthermore, each sideband taken alone contains all the information present in a modulated wave, and it is possible to suppress the carrier wave and one sideband and still transmit the modulating information. In this manner, it is possible to transmit a given signal with a frequency band only half as wide as that required by a modulated wave consisting of two sidebands and a carrier and while also saving over two-thirds in power because of the suppression of the carrier wave. Thus, if a carrier wave at a frequency of five megacycles per second is modulated by a signal having a frequency that alternates between 1350 and 450 cycles per second, respectively, all the information will be conveyed by the sidebands, and if the lower sideband and the carrier are suppressed, the information will be conveyed by the shift of the upper sideband between 5,000,450 cycles per second and 5,001,350 cycles per second.

The upper sidebands at 5,000,450 and 5,001,350 cycles per second of the five megacycle per second carrier wave may be considered, if desired, to be an imaginary carrier wave or sub-carrier wave whose frequency has been shifted from its normal center frequency by 450 cycles. That is, these upper sidebands are equivalent to a carrier wave shifted from its center frequency of 5,000,900 cycles per second to 5,000,450 or 5,001,350 cycles per second. The upper sidebands of the amplitude-modulated wave may also be considered to be a carrier of 5,000,450 cycles per second which is shifted in frequency to 5,001,350 cycles per second or, vice versa.

In angle modulation (frequency or phase modulation), sidebands are also produced at the same sideband frequencies as those produced in amplitude modulation. That is, sidebands will appear at the carrier wave frequency plus the modulating frequency and at the carrier wave frequency minus the modulating frequency. In addition, sidebands will be produced at other frequencies of higher order that differ from the carrier wave frequency by integral multiples of modulation frequency. However, if the deviation ratio is maintained small as, for example, on the order of one-half or less, the amplitudes of the higher order sideband components will be negligible. Thus, frequency or phase modulating a five megacycle per second carrier wave by mark and space modulating frequencies of 1350 and 450 cycles per second will also produce upper sidebands at 5,001,350 and 5,000,450 cycles per second. The only difference between the sidebands produced by angle modulation and those produced by amplitude modulation is in the relationship of the relative phases and amplitudes of the sidebands to the phase and amplitude of the carrier wave. The sidebands produced by frequency modulation will not be identical in amplitude with those produced by phase modulation. That is, in frequency modulation, the sideband produced by the space frequency of 450 cycles per second will have a different amplitude from that produced by the mark frequency of 1350 cycles per second, whereas, in phase modulation, the amplitudes of the sidebands produced by the mark and space frequencies will be identical. However, if desired, a frequency modulation transmitter may be easily modified to produce sidebands of the same amplitude for the mark and space frequencies. That is, the amplitude of the 1350 cycles per second modulating signal may be made three times as great as the amplitude of the 450 cycles per second modulating signal. This creates a phase modulation sideband structure in the output of the frequency modulation transmitter.

In one form of radiotelegraph operation known as "frequency-shift-keying," which is a special form of frequency modulation, a carrier wave of 5,000,900 megacycles per second, for example, may be shifted in frequency for a space symbol to 5,000,450 cycles per second and shifted to 5,001,350 cycles per second for a mark symbol. This is also equivalent to a 5,000,450 cycle per second carrier wave which indicates a space symbol and is shifted to 5,001,350 cycles per second to indicate a mark symbol or vice versa.

It will be observed that for dual-symbol, radiotelegraph operation such as has been discussed above, a unique sideband structure conveys the information to be transmitted. Furthermore this unique sideband structure may be produced by any modulation method. More particularly, with normal amplitude modulation, single sideband operation, suppressed carrier operation, angle modulation (frequency modulation and phase modulation) and frequency-shift-keying, mark and space symbols will be denoted by the presence of energy at either 5,001,350 or 5,000,450 cycles per second for the exemplary frequencies chosen. Thus if one receiving station is to receive transmissions from a number of different transmitting stations, each being equipped with a transmitter providing a different one of the above forms of modulation, it is desirable to utilize one receiver to compatibly receive transmissions from each of the different transmitters.

In such a receiver, it is necessary to provide an artificial or locally-generated carrier wave whose frequency and phase is identical to that of the carrier wave of the received signal. However, unless the frequency and phase of the locally generated carrier wave is accurately controlled, the receiver will not operate properly. When a signal is received which contains the carrier wave component and/or both sidebands, the locally generated carrier wave must be synchronous or phase-coherent with the carrier wave component. However, when only the one set of sidebands are present, then phase-synchronism is not required but the frequency must be exact. Therefore, automatic frequency and phase control must be used to control the frequency and phase of the locally generated carrier wave. However, the Foster-Seeley frequency discriminator and the ratio detector will not operate properly in such an automatic frequency control loop. Those circuits would produce different output voltages for the mark and space frequencies which would change the frequency of the locally generated carrier wave with the modulation. In addition, commonly used frequency discriminators do not have a sufficiently wide pull-in range to capture a signal which is far off the assigned frequency as may happen, for example, due to doppler shift when communication is attempted between locations which are rapidly moving relative to each other.

Accordingly, it is an object of the present invention to provide a receiver for demodulating compatibly radiotelegraph signals which are developed by amplitude modulation with or without suppression of the carrier wave and/or one of the sidebands, frequency or phase modulation, or frequency-shift-keying.

A further object of the invention is the provision of a circuit for controlling the frequency and phase of an injection signal applied to a synchronous demodulator for demodulation of amplitude or angle modulated carrier waves, with or without suppression of the carrier and/or one of the sidebands.

An even further object of the invention is to provide a novel frequency discriminator operable over a wide band of frequencies for use with two modulating frequencies having an odd harmonic relationship.

In accordance with these and other objects of the invention a received radiotelegraph signal having mark and space information conveyed by the presence of energy at two different radio frequencies is applied to the signal inputs of first and second synchronous demodulators. A locally generated artificial carrier wave is applied in phase quadrature to the injection inputs of the synchronous demodulators from a voltage controlled oscillator. The two synchronous demodulators demodulate the received signal but because of the 90° phase relationship between the carrier wave injected into the two synchronous demodulators, when the first or "in-phase" synchronous demodulator is demodulating the received signal, the second or "quadrature" synchronous demodulator produces a zero signal output. The outputs of the two synchronous demodulators are compared in a novel frequency and phase detector, which has an output connected to the control input of the voltage controlled oscillator, thereby to maintain the frequency and phase of the locally generated carrier wave at that frequency and phase that produces zero signal output from the "quadrature" synchronous demodulator, thus completing an automatic frequency and phase control loop. The demodulated output signals from the "in-phase" synchronous demodulator are applied to two narrowband filters, one filter being tuned to the mark modulating frequency and the other filter being tuned to the space modulating frequency. The filters provide the necessary selectivity of the receiver. The outputs of the two filters are individually coupled to separate rectifiers, one connected to produce an output pulse of positive polarity and the other connected to produce an output pulse of negative polarity. The outputs of the rectifiers are combined into a train of positive and negative pulses to indicate mark and space symbols and applied to a utilization circuit.

The frequency and phase detector utilized in the radio receiver of the present invention includes a novel form of frequency discriminator. The outputs of the "quadrature" and "in-phase" synchronous demodulators are shifted in phase to have a constant 90° phase difference regardless of the frequency of the demodulated signals. The phase-shifted outputs of the synchronous demodulators are combined to provide a demodulated signal component derived from one sideband of the received signal. The combined demodulated signal is applied to time delay means. The time delay is one-half the period of the lower or space frequency and the mark and space frequencies have an odd harmonic relationship so that the delay means provides an integral number of half cycles of phase shift for each frequency. The signal applied to the delay means is also applied in phase quadrature therewith to one input of a first phase detector. The output of the delay means is applied to the other input of the first phase detector. Frequency deviations will change the phase relationship of the signal at the output of the delay means due to different phase shifts through the delay means, although the effective phase shift will be the same for either the mark or space signal. In response thereto, the first phase detector provides a frequency correction voltage proportional to the deviations of the mark and space frequency from the correct value. The output of the "quadrature" synchronous demodulator and the "in-phase" synchronous demodulator are also applied to the inputs of a second phase detector which develops at its output a voltage proportional to the phase deviations of the applied signal. The outputs of the two phase detectors are then combined to provide a composite control voltage representative of differences in phase and frequency of the received modulating signal from the correct value and is used to control the frequency and phase of the locally generated artificial carrier wave.

The following specification and the accompanying drawing describe and illustrate an exemplification of the present invention. Consideration of the specification and the drawing will provide a complete understanding of the invention including the novel features and objects thereof. Like reference characters are used to designate like parts throughout the figures of the drawing.

FIG. 1 is a diagram of an embodiment of a radio communication receiver in accordance with the invention; and FIG. 2 is a diagram of an embodiment of a frequency and phase detector used in the radio receiver of FIG. 1.

Referring now to FIG. 1 of the drawing, there is shown a radio receiver in accordance with the invention having an antenna 10 for intercepting radio signals. The antenna 10 is connected to the input of a receiver 11, which may be, for example, a standard communication receiver, such as the type SP-600-JX manufactured by the Hammarlund Manufacturing Corporation. The output of the intermediate frequency amplifiers of the receiver 11 is applied to the inputs of two phase-coherent detectors which may be synchronous demodulators 12 and 13. In general, such devices are variations of the well-known balanced modulator in which a local signal switches a diode modulator in synchronism with a received signal. In this manner, the incoming signal is mixed or multiplied with the local signal in the detector and the demodulated output is directly produced. Circuits suitable for use as synchronous demodulators 12 and 13 will be found in Technical Report No. 80 of the Cruft Laboratories of Harvard University, 1949, entitled "The Coherent Detector" by Middleton and Hatch. The synchronous demodulators 12 and 13 include low-pass filters for filtering the demodulated output. The first synchronous demodulator 12 will be referred to as the "in-phase" synchronous demodulator and the second synchronous demodulator 13 will be referred to as the "quadrature" synchronous demodulator. A locally generated artificial carrier wave or injection signal is developed by a controllable oscillator such as a voltage controlled oscillator 14 which may comprise a reactance tube circuit and an oscillator such as shown on page 655 of Radio Engineers' Handbook by F. E. Terman, McGraw-Hill Book Co., 1943.

The output of the voltage controlled oscillator 14 is applied to the two synchronous demodulators 12 and 13 in phase quadrature. This is accomplished by connecting the output of the voltage controlled oscillator 14 directly to the injection input of the in-phase synchronous demodulator 12 and through a 90° phase shift circuit 15 to the injection input of the quadrature synchronous demodulator 13. However, if desired, the 90° phase shifter 15 may be replaced by two 45° phase shifters, each connected between the output of the voltage controlled oscillator 14 and one of the synchronous demodulators 12 and 13. The 90° phase shifter 15 may be a simple resistive-capactive network because the frequency of the injection signal from the voltage controlled oscillator 14 is substantially constant. The outputs of the synchronous demodulators 12 and 13 are each applied to the inputs of a frequency and phase detector 20, which circuit will be hereinafter described in more detail.

The output of the frequency and phase detector 20 is connected to the control input of the voltage controlled oscillator 14 to complete an automatic frequency and phase control loop which maintains the frequency and phase of the signal generated by the voltage controlled oscillator 14 correct to provide proper synchronous demodulation. To the output of the in-phase synchronous demodulator 12, is connected a pair of narrowband filters 41 and 42. The first filter 41 is tuned to the mark frequency, which in the present example is 1350 cycles per second, and the second filter 42 is tuned to the space frequency of 450 cycles per second. These filters 41 and 42 may be constructed of inductors and capacitances, may utilize crystals, or may utilize mechanical filter elements. If desired, amplifiers may be inserted between the inphase synchronous demodulator 12 and the filters 41 and 42 to increase the amplitude of the demodulated signal.

A first rectifier 43 is connected to the output of the mark filter 41 with a polarity such as to produce positive output voltages and a second rectifier 44 is connected to the output of the space filter 42 with such a polarity as to produce negative output voltages. These rectifiers 43 and 44 may be diodes if desired, followed by low-pass filters. The outputs of the two rectifiers 43 and 44 are combined in a summing amplifier and limiter 45 constructed as shown on page 1149 of Radiotron Designers' Handbook, fourth edition, reproduced and distributed by Radio Corporation of America, the circuit being modified to have a resistive network at the input to mix the two input signals. To the output of the summing amplifier and limiter 45 is connected a utilization circuit 46 which may be any form of pulse decoder such as, for example, a teletypewriter.

Referring now to FIG. 2, the frequency and phase detector 20 will be described in more detail. The outputs of the synchronous demodulators 12 and 13 are individually connected to the inputs of a first phase detector 21, which may be in accordance with the circuit diagram shown on page 384 of vol. 21 of the MIT Radiation Laboratory Series entitled Electronic Instruments, McGraw-Hill Book Co., Inc., 1948, and includes a low-pass filter to provide a direct current output. The outputs of the synchronous demodulators 12 and 13 are also individually connected to the inputs of a wide-band 90° phase difference network shown as a pair of 45° phase shifters 22 and 23. The first phase shifter 22 connected to the quadrature synchronous demodulator 13 provides a negative 45° relative phase shift and the second phase shifter 23 connected to the inphase synchronous demodulator 12 provides a positive 45° relative phase shift. In this manner, a total phase difference of 90° exists between the outputs of the two phase shifters 22 and 23.

The 90° phase difference provided by the two phase shifters 22 and 23 is constant over a wide variation in the frequency of the demodulated signals applied thereto. The phase shifters 22 and 23 may be designed in accordance with the principles described in the paper entitled "Design of RC Wide-Band 90-Degree Phase-Difference Network" by D. K. Weaver, published on pages 671–676 of the April 1954 issue of the Proceedings of the IRE, volume 42. These phase shifters 22 and 23 are equivalent to the networks referred to as an "alpha network" and a "beta network" in the paper entitled "The Phase-Shift Method of Single-Sideband Signal Reception" by D. E. Norgaard, published on pages 1735–1743 of the December 1956 issue of the Proceedings of the IRE, volume 44. The actual phase shift produced by the phase shifters 22 and 23 will not necessarily be 45° and will vary with the frequency of the applied demodulated signal, but the phase difference between the outputs of the phase shifters 22 and 23 is a constant 90°.

The outputs of the two phase shifters 22 and 23 are combined in a first summing network 24 which may be, for example, a resistive network. Due to the 90° phase difference at the output of the phase shifters 22 and 23, the output of the summing network 24 is a demodulated signal derived from only the upper sideband. By exchanging the minus 45° phase shifter 22 for the plus 45° phase shifter 23, the output of the summing network 24 may be changed to a signal derived from only the lower sideband. This technique is employed in conventional single-sideband receivers. The signal derived from the upper sideband is passed, and the signal derived from the lower sideband is rejected. If no signal energy is present at the lower sideband frequency, the noise energy appearing at that frequency is rejected.

The output of the summing network 24 is connected to the input of an electrical delay line 25 having a linear phase delay characteristic with applied frequency. The type L40 magnetostrictive delay line manufactured by the Ferranti Electric Corporation, will be found to be satisfactory for the purposes of this invention. The delay line has a delay equal to half the period of the lower of the two modulation frequencies which, in the present example, is the space frequency of 450 cycles per second and, thus, the delay line 25 is adjusted or selected to have an electrical delay of 1.11 milliseconds. The output of the summing network 24 is also coupled to one input of a second phase detector 27 in phase quadrature with the input to the delay line 25. The second phase detector 27 may be identical to the first phase detector 21. The signals at the inputs of the delay line 25 and the second phase detector 27 are maintained in phase quadrature by a second wide-band 90° phase difference network similar to that discussed above in connection with the 45° phase shifters 22 and 23. For purposes of clarity, the second wide-band 90° phase difference network is shown as a 90° phase shifter 26 inserted between the output of the first summing network 24 and the first input of the second phase detector 27. The output of the delay line 25 is connected to the second input of the second phase detector 27.

The delay line 25, the 90° phase shifter 26, and the second phase detector 27, together comprise a frequency discriminator of a type adapted for use in the automatic frequency and phase control loop of the type of radio receiver herein described. The frequency sensing element is the delay line 25 rather than a resonant circuit as in conventional frequency discriminators. The frequencies used with the present discriminator must be odd harmonics of the lowest frequency and the delay of the delay line 25 must be such as to provide an integral number of half cycles phase shift at each frequency used. The outputs of the two phase detectors 21 and 27 are combined in a second summing network 28 whose output is connected to the control input of the voltage controlled oscillator 14.

In operation, a dual symbol radiotelegraph signal or any other form of binary modulated signal, such as a telemetering signal, is intercepted by the antenna 10. The signal may be a frequency-shift-keyed signal, an angle-modulated signal (frequency or phase modulated), or an amplitude-modulated signal with or without suppression of the carrier and/or one of the sidebands. Regardless of the manner in which the signal is produced, it has a unique sideband structure in that the signal alternates between two radio frequencies such as, for example, 5,000,450 and 5,001,350 cycles per second. Thus, the modulating frequencies are 450 and 1350 cycles per second, the latter frequency being the third harmonic of the first frequency. The receiver 11 is tuned to amplify the intercepted signal and to convert it to an intermediate frequency signal which may be, for example, a signal alternating between 456,350 and 455,450 cycles per second. The intermediate frequency signal is demodulated by the in-phase synchronous demodulator 12 to develop at the output thereof a demodulated signal at the mark and space frequencies of 1350 and 450 cycles per second.

When the demodulated signal at the output of the in-phase synchronous demodulator 12 is at the mark frequency of 1350 cycles per second, it passes through the mark filter 41 to the positive rectifier 43 and is rejected by the space filter 42. When the signal at the output of the in-phase synchronous demodulator 12 is at the space frequency of 450 cycles per second, it passes through the space filter 42 to the negative rectifier 44 and is rejected by the mark filter 41. Each time a signal passes through the mark filter 41, the positive rectifier 43 produces a positive pulse at its output, and each time a signal passes through the space filter 42, the negative rectifier 44 produces a negative pulse at its output. These positive and negative pulses are combined in the summing amplifier and limiter 45 to produce at the output thereof a train of positive and negative pulses representing mark and space symbols. The positive and negative pulses are then applied to the utilization circuit 46 where they are decoded and displayed as, for example, by a teletypewriter.

The operation of the automatic frequency and phase control loop will now be described. When the frequency and phase of the injection signal from the voltage controlled oscillator 14 is correct, the in-phase synchronous demodulator 12 demodulates the applied input signal. However, the quadrature synchronous demodulator 13 produces no output signal because the phase of the injection signal applied thereto from the voltage controlled oscillator 14 is 90° away from the phase necessary to derive information from the signal. When no output signal is produced by the quadrature synchronous demodulator 13, no output voltage is produced by the first phase detector 21 and thus, no phase correction voltage is applied to the voltage controlled oscillator 14.

Inasmuch as the frequency of the injection signal from the voltage controlled oscillator 14 is correct, the signal applied to the delay line 25 from the in-phase synchronous demodulator 12 has a frequency of either 450 and 1350 cycles per second. The delay line 25 delays the demodulated signal by 1.11 milliseconds which is one-half cycle at 450 cycles per second or one and one-half cycles at 1350 cycles per second. This is equivalent to 180° phase shift at 450 cycles per second and 540° phase shift at 1350 cycles per second. But 540° phase shift is equivalent to a whole cycle plus 180°. Thus, regardless of whether a mark or space signal is being received, when the frequency of the injection signal from the voltage controlled oscillator 14 is correct, the demodulated signal is effectively shifted by 180° in passing through the delay line 25. The signal is also shifted by 90° in the 90° phase shifter 26. When these two phase shifted signals are applied to the second phase detector 27, they are in phase quadrature and no output voltage is produced thereby. Hence, when the frequency of the injection signal from the voltage controlled oscillator 14 is correct, no frequency correction voltage is applied thereto.

As the phase of the injection signal from the voltage controlled oscillator 14 deviates from the correct value due to variations in the frequency of the received signal, variations in the tuning of the receiver 11, or variations in the voltage controlled oscillator 14, an output signal is produced by the quadrature synchronous demodulator 13. The signals from the two demodulators 12 and 13 are applied to the first phase detector 21 which produces a phase control voltage that passes through the summing network 28 to the voltage controlled oscillator 14 and corrects the phase of the injection signal therefrom. This phase correction voltage has an amplitude proportional to the sine of the phase angle error and a polarity corresponding to the sign of the phase angle error. When the signal being demodulated by the synchronous demodulators 12 and 13 has a carrier wave, the injection signal from the voltage controlled oscillator 14 locks in phase with the carrier wave. This also occurs when the carrier wave is suppressed but both sidebands are present. However, when both the carrier wave and one of the sidebands are suppressed, or completely absent then it is only necessary for the frequency of the injection signal from the voltage controlled oscillator 14 to be correct. In this case, no significant output voltage is developed by the first phase detector 21.

Correct operation of the automatic phase control loop through the first phase detector 21 is dependent on the initial frequency of the injection signal from the voltage controlled oscillator 14 being close to the correct frequency. In the present example, the correct frequency is 455 kilocycles per second. The automatic phase-control loop has a wide holding range of frequency but a narrow pull-in range. The coarse correction or frequency control is accomplished by the frequency discriminator comprising the 90° phase shifter 26, the delay line 25, and the second phase detector 27. The constant time delay of the delay line 25 translates a frequency error at its input to a phase difference between its input and output terminals. The mark and space frequencies are harmonically related so that a single delay time may be used for both frequencies, and an equivalent phase shift will be produced by each frequency for any given amount of frequency error which is additive to both.

As an example, assume that the frequency error is 50 cycles per second, then the demodulated signal has a frequency of either 500 or 1400 cycles per second instead of 450 or 1350 cycles per second. The phase delay of the 500 cycle per second signal is 200° in the delay line 25. This is 20° greater than the 180° phase shift obtained when the correct 450 cycle per second signal is applied thereto. Similarly, the 1400 cycle per second signal is delayed 560°, 20° more than the 1350 cycle per second signal which is delayed only 540°. Thus, the frequency error of 50 cycles per second is converted to a phase error of 20° by the delay line regardless of whether a mark or space signal is being received.

The 90° phase shifter 26 merely applies the undelayed signal to the other input of the second phase detector 27 in quadrature with the delayed input so that the phase detector 27 can operate properly. Thus, the delay line 25 introduces a phase difference between the two inputs of the phase detector 27 so that the output of the second phase detector 27 is a voltage proportional to the sine of the phase angle error, and the polarity of the output indicates whether the frequency is higher or lower than the desired frequency.

Thus, the automatic frequency control loop making use of the delay line 25 corrects the injection signal from the voltage controlled oscillator 14 to the desired frequency. During the time the automatic frequency control loop is correcting the frequency of the injection signal, the output of the first phase detector 21 is a varying signal having a frequency equal to the frequency error of the injection signal. The low pass filter incorporated in the output of the first phase detector 21 prevents this varying signal from reaching the voltage controlled oscillator 14 until the frequency error is very small. When this occurs, the automatic phase control loop through the first phase detector 21 corrects the phase of the injection signal. The two 45° phase shifters 22 and 23 cause the signal applied to the delay line 25 to be that derived from the upper sideband of the received signal. Therefore, the automatic frequency control is only operative with respect to the upper sideband. Thus, regardless of whether the received signal is of the frequency-shift-keyed type, the single sideband type, or the double sideband type, the automatic frequency control loop operates properly.

In this manner, the automatic frequency control loop is able to correct for frequency errors as great as plus or minus 225 cycles per second in the present example. For doppler frequency shifts, this corresponds approximately to a speed equivalent to a Mach number of 7 at 30 megacycles per second. This figure of plus or minus 225 cycles per second is approximately half the frequency of the low frequency modulating signal of 450 cycles per second. When a higher low frequency modulating signal is used, the automatic frequency control loop is able to correct for correspondingly higher frequency errors. Theoretically, the frequency range of the present frequency discriminator is even greater, but is presently limited by the difficulty in designing a wide band 90° phase difference network that provides a constant phase difference over a frequency bandwidth in excess of one decade.

The frequencies of the space and mark signals were chosen to be 450 and 1350 cycles per second because the conventional separation between space and mark signals in radioteletype operation is 900 cycles per second. An 850 cycle per second separation is often used also. For this separation, the space frequency would be 425 cycles per second and the mark frequency 1275 cycles per second and the delay line 25 would provide a delay of 1.125 milliseconds.

The automatic frequency and phase control loops are able to capture and track a signal at signal-to-noise ratios as low as from approximately zero to minus ten decibels. The actual tracking capability is a function of the maximum acceptable error rate in the utilization circuit 46 which depends upon the bandwidth of the mark and space filters 41 and 42. The tracking capability is designed to be no better than that required to provide the maximum acceptable error rate and depends on the bandwidth of the low pass filters at the output of the phase detectors 21 and 27. As an example, if the receiver is designed for 60 words per minute radioteletype operation, the bandwidth may be reduced by a factor of ten and the automatic frequency and phase control loop may be made to track at a signal-to-noise ratio of minus ten decibels.

Because the radio receiver of the present invention is asynchronous, it is capable of handling data at any signaling rate up to 250 bits per second. Assuming 5 bits per character and 5 characters per word, this is the equivalent of 600 words per minute. This data-rate limit is set by bandwidth and error rate considerations as pointed out above. Higher data rates require wider bandwidths and would compromise the signal-to-noise performance of the receiver.

Although a two-tone system has been described, it should be apparent that a four-tone system may be devised in accordance with the present invention and would have the advantage of frequency diversity. The four-tone system would have a superior ability to combat selective fading. The minimum operating signal-to-noise ratio for the two-tone case of the present example is approximately zero decibels. The four-tone system would be capable of operating with a signal-to-noise ratio of minus four decibels due to frequency diversity. The required increase in equipment complexity for a four-tone system is small. Only two additional audio band-pass filters and rectifiers would be required, as well as a diversity combining circuit composed of diodes and resistors.

Thus, there has been described a radio receiver having a novel automatic frequency control circuit enabling compatible demodulation of a frequency-shift-keyed radio signal conveyed by either angle modulation or amplitude modulation, with or without suppression of the carrier wave and/or one sideband.

What is claimed is:

1. A circuit for demodulating a radio signal alternating between two different radio frequencies comprising: a synchronous demodulator having an input signal alternating between two different radio frequencies for developing an output signal that alternates between two lower frequencies in proportion to said input signal, said two lower frequencies having an odd harmonic relationship, means coupled to the output of said synchronous demodulator for separating the two lower frequency components of said output signal, a controllable oscillator having its output coupled to said synchronous demodulator for applying an injection signal to an injection input thereof, and sensing means including means providing a time delay equal to one-half the period of the lower of said two lower frequencies coupled to the input and output of said synchronous demodulator and responsive to said radio signal and to said output signal for developing a control signal proportional to deviations of the relative frequency and phase of said output signal from predetermined values, the output of said sensing means being coupled to a control input of said controllable oscillator for controlling the frequency and phase of said injection signal in accordance with said control signal.

2. An automatic frequency and phase control circuit comprising: a first synchronous demodulator having its input coupled to an input terminal and its output coupled to an output terminal, a second synchronous demodulator having its input coupled to said input terminal, a controllable oscillator including first phase-shifting means for coupling its output signal to injection inputs of said synchronous demodulators in phase quadrature, a phase detector having its inputs individually coupled to the outputs of said synchronous demodulators, respectively, second phase-shifting means coupled to the outputs of said synchronous demodulators for shifting the relative phase of signals from said synchronous demodulators by 90°, a first summing network having its input coupled to the outputs of said second phase-shifting means for combining said relatively phase shifted signals, a frequency discriminator including means providing a time delay having its input coupled to the output of said first summing network, and a second summing network having its inputs individually coupled to the outputs of said phase detector and said frequency discriminator, respectively, the output of said second summing network being coupled to a control input of said controllable oscillator.

3. A frequency and phase detector comprising: a first phase detector having its inputs individually coupled to two input terminals, respectively, a first phase-shift circuit having its input coupled to said input terminals for shifting the relative phase of signals applied thereto by 90°, a first summing network having its inputs coupled to the output of said first phase-shift circuit, an electrical delay line, a second phase detector, a second phase-shift circuit having its input coupled to the output of said first summing network and being connected so that the output of said first summing network is applied to the input of said delay line and to a first input of said second phase detector in phase quadrature, a second input of said second phase detector being coupled to the output of said delay line, and a second summing network having its inputs individually coupled to the outputs of said phase detectors, respectively, the output of said second summing network being coupled to an output terminal.

4. A circuit for developing an output voltage indicative of the frequency and phase deviation of a signal from either of two nominal frequency values having an odd harmonic relationship comprising: a phase detector responsive at its two inputs to two components of said signal for developing a phase control voltage indicative of the deviation in phase of said signal from a predetermined value, a frequency discriminator including means providing a delay equal to half the period of said signal at the lower of said two nominal frequency values to provide equivalent phase shifts through said delay means for either of said two nominal frequency values, said frequency discriminator having its input coupled to the input of said phase detector for developing a frequency control voltage indicative of the deviation in frequency of said signal from predetermined values, and a summing network having its inputs coupled to said phase detector and said frequency discriminator for developing a combined control voltage at an output terminal.

5. A frequency and phase detector comprising: first phase detection means having its inputs individually coupled to two input terminals, respectively; first phase-shift means having its input coupled to said input terminals for shifting the relative phase of signals applied thereto by 90°; first summing means having its inputs coupled to the output of said first phase-shift means; electrical delay means; second phase detection means; second phase-shift means having its input coupled to the output of said first summing means and being connected so that the output of said first summing means is applied to the input of said delay means and to a first input of said second phase detection means in phase quadrature; a second input of said second phase detection means being coupled to the output of said delay means; and second summing means having its inputs individually coupled to the outputs of said first and second phase detection means, respectively, the output of said second summing means being coupled to an output terminal.

6. A circuit for demodulating a radio signal alternating between two frequencies comprising: a synchronous demodulator responsive to said radio signal for developing an output signal that alternates between two lower frequencies in proportion to said radio signal, said two lower frequencies having an odd harmonic relationship, a controllable oscillator having its output coupled to said synchronous demodulator for applying an injection signal to an injection input thereof, and sensing means including means providing a time delay equal to one-half the period of the lower of said two lower frequencies coupled to the input and output of said synchronous demodulator and responsive to said radio signal and to said output signal for developing a control signal proportional to deviations of the relative frequency and phase of said output signal from predetermined values, the output of said sensing means being coupled to said controllable oscillator for controlling the frequency and phase of said injection signal in accordance with said control signal.

7. A radio receiver for demodulating a signal having at least one sideband with a predetermined energy distribution regardless of the presence or absence of a carrier wave or a second sideband, said predetermined sideband energy distribution being the alternate presence of energy at first and second frequencies to convey binary intelligence, said radio receiver including a first synchronous demodulator responsive to said signal for demodulation thereof to derive said binary intelligence therefrom, a controllable oscillator coupled to said first synchronous demodulator for providing a locally-generated carrier wave thereto, and an oscillator control circuit coupled between the output of said first synchronous demodulator and said oscillator for controlling the frequency and phase of said locally-generated carrier wave, said oscillator control circuit comprising: a second synchronous demodulator responsive to said signal, the output of said oscillator being coupled to said second synchronous demodulator through first phase shifting means so that the locally-generated carrier wave output of said oscillator is applied to said second synchronous demodulator in phase quadrature with the carrier wave applied to said first synchronous demodulator, summing and phase shifting means coupled to the outputs of said first and second synchronous demodulators for combining demodulated signals therefrom in phase quadrature, means providing a predetermined time delay having its input coupled to the output of said summing and phase shifting means, second phase shifting means providing ninety degrees phase shift and having its input coupled to the output of said summing and phase shifting means, a first phase detector having its inputs individually coupled to the outputs of said delay means and said second phase shifting means, a second phase detector having its inputs individually coupled to the outputs of said first and second synchronous demodulators, and summing means coupled to the outputs of said first and second phase detectors for combining output voltages therefrom, the output of said summing means being coupled to a control input of said oscillator for control thereof.

References Cited in the file of this patent

UNITED STATES PATENTS

| | | |
|---|---|---|
| 2,229,640 | Crosby | Jan. 28, 1941 |
| 2,316,017 | Peterson | Apr. 6, 1943 |
| 2,585,532 | Briggs | Feb. 12, 1952 |
| 2,833,857 | Robin | May 6, 1958 |
| 2,997,577 | Kaminski et al. | Aug. 22, 1961 |
| 3,028,487 | Losee | Apr. 3, 1962 |